United States Patent Office 3,642,845
Patented Feb. 15, 1972

3,642,845
HYDROCARBYLENE BIS(TRIALKYL TIN) COMPOUNDS
Hugh E. Ramsden, Scotch Plains, N.J., assignor to Esso Research and Engineering Company
No Drawing. Filed Jan. 2, 1969, Ser. No. 788,640
Int. Cl. C07f 7/22; A01n 9/00
U.S. Cl. 260—429.7                5 Claims

ABSTRACT OF THE DISCLOSURE

Bis-trialkyltin compounds of the formula $$(R)_3SnR'Sn(R)_3$$

where R is an alkyl group such as $CH_3$ or $C_2H_5$, and R' is a diradical selected from the group of precursor complexes with magnesium e.g.,

resulting from the reaction of magnesium with: (1) conjugated diolefins, (2) mixtures of conjugated diolefins, (3) mixtures of conjugated diolefins and olefins, (4) mixtures of conjugated diolefins and condensed ring aromatic hydrocarbons, (5) mixtures of conjugated diolefins and cyclic-enes, (6) styrenes, (7) mixtures of styrenes and olefins, (8) mixtures of styrenes and condensed ring aromatic hydrocarbons, and (9) condensed ring hydrocarbons, etc., and formulations of such compounds with inert diluents are effective systemic pesticides against lepidopterus insect larvae, such as, e.g., Southern army worm, cotton boll worm, etc.

PRIOR ART

Organotin compounds are well known in the art. For example, alkyltin compounds, polyalkyl and polycycloalkyltin compounds such as tetrabutyltin and tributyltin, etc. are disclosed in U.S. Pat. 3,067,226. Other alkyltin compounds, such as diethyldibutyltin, ethyltributyltin, tri-n-butylisobutyltin, etc. are disclosed in U.S. Pat. 3,095,433. Derivatives of such alkyltin compounds, moreover, are also well known. For example, trialkyltin propiolates are disclosed in U.S. Pat. 3,257,194, and triorganotin oximes and their preparation are disclosed in U.S. 3,275,659. Additionally, many other organotin derivatives are well known in the art such as, for example, the organotin hydroxides disclosed in U.S. Pat. 3,117,146, the organotin borates such as disclosed in U.S. Pat. 3,312,725, and the organotin arsonates as disclosed in U.S. Pat. 2,762,821.

Application or use of organotin compounds as pesticides has likewise been well known for a long time in the art. For example, U.S. 3,070,433 discloses the use of trialkyltin cyanides as herbicides. Additionally, organotin compositions of the general formula

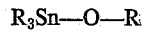

are disclosed as useful fungicides and bactericides. Compounds of the formula $Rn-Sn-X_{4-n}$ wherein R is an organic radical, $n$ is an integer of 1, 2, or 3, and X is an organic radical obtained by removing a terminal hydrogen atom from a basically substituted phenol or oxime, are disclosed as useful fungicides and bactericides in U.S. Pat. 3,210,245. The trialkyltin propiolates, previously referred to above, are disclosed as useful biological toxicants, with specific application as insecticides, fungicides, and herbicides.

While all the aforementioned organotin compounds and/or their application as pesticides represent only a small portion of what is known in the art relative to the existence of organotin compounds and their use as pesticides, it can nevertheless be seen from the diversity in scope of the organotin compounds described that this art is indeed a populous one. However, the prior art has not been heretofore cognizant of the present type compounds or their utility as pesticides, particularly as insecticides having systemic activity against the Southern army worm, etc.

FIELD OF THE INVENTION

The present invention relates to compounds and compositions having pesticidal activity. More particularly, this invention relates to bis-trialkyltin compounds and pesticidal compositions thereof which are effective systemic pesticides against lepidopterus insect larvae, such as, Southern army worm, cotton boll worm, etc.

DESCRIPTION OF THE INVENTION

It has now been found that new and useful organotin compounds having the formula $$(R)_3SnR'Sn(R)_3$$

where R is $CH_3$ or $C_2H_5$ or combinations thereof and R' is a diradical represented by the following formula;

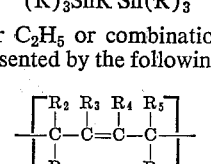

wherein $R_1$ to $R_6$ can be the same or different and each is a radical selected from the group consisting of hydrogen, lower aliphatic, aryl, aralkyl, and alkadienyl; and $n$ is a positive integer of from 2 to 8. The diradical can be one selected from the group of aliphatic precursors or complexes with magnesium resulting, e.g., from the reaction of magnesium with conjugated diolefins, mixtures of conjugated diolefins, mixtures of conjugated diolefins and olefins, mixtures of conjugated diolefins and condensed ring aromatic hydrocarbons, mixtures of conjugated diolefins and cyclic-enes, styrenes, mixtures of styrenes and olefins, mixtures of styrenes and conjugated diolefins, mixtures of styrenes and condensed ring aromatic hydrocarbons, etc. The present organotin compounds can be prepared by a two-stage process wherein, in the first stage, compounds of the above-mentioned group are reacted with magnesium to form an organo-magnesium complex which can then be converted to the desired organotin compounds by reaction with trialkyl, preferably trimethyl or triethyltin chloride according to the following equations:

First stage (1) (a)

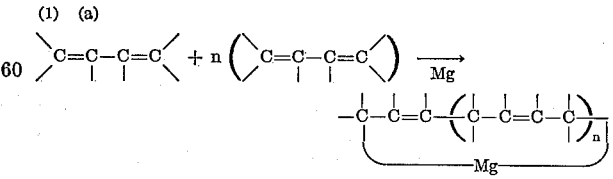

wherein $n$ is an integer from 1 to 7 and the conjugated diolefins may be the same or different.

(b)
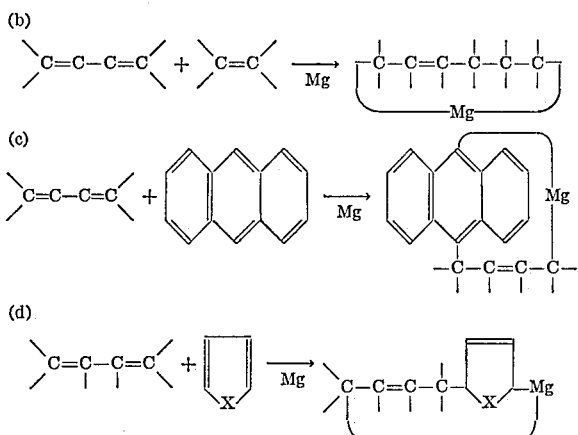

(c)

(d)

wherein X can be oxygen, sulfur or a substituted amine;

(e)
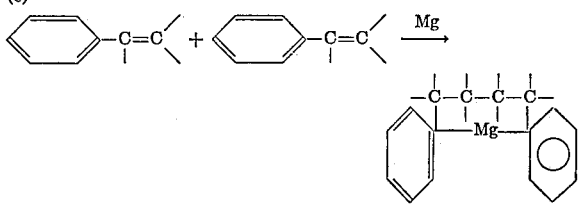

wherein the styrenes may be the same or different;

(f)
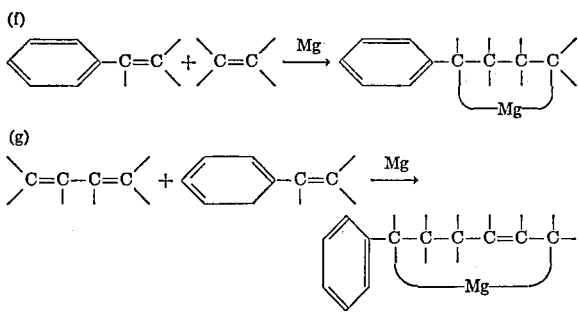

(g)

(h)
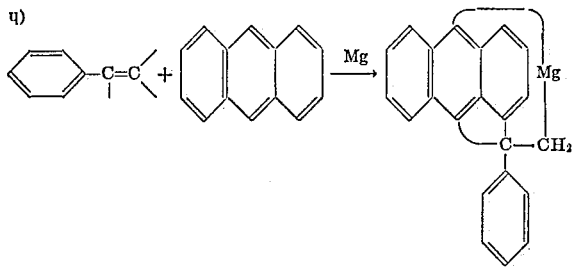

(i)
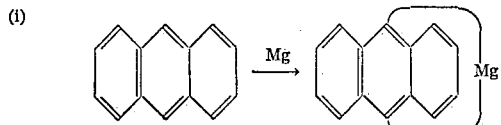

Second stage (2) 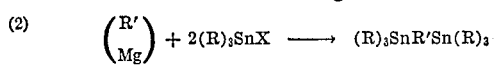

It has been further found that the bis-trimethyl or triethyl tin compounds of this invention have activity as pesticides, particularly as insecticides.

The above-mentioned conjugated diolefins, mixtures thereof etc., react with magnesium to form the desired complexes at temperatures ranging from 20° to about 170° C. The reaction may be effected in the presence of a solvent or reaction medium such as (1) high boiling, (e.g., above 100° C.) mononuclear aromatic hydrocarbons, e.g. benzene, toluene, xylene, mesitylene, diethyl benzenes, cumenes, etc.; (2) high boiling (e.g., above 60° C.) ethers and polyethers, e.g., n-butyl ether, mixed alkyl aryl ethers, (e.g., anisole), diethyl carbitol, etc.; and (3) high boiling saturated paraffinic hydrocarbons, e.g., isooctane, n-octane, kerosene, mineral spirits, etc.

The preferred medium in which to carry out the formation of the magnesium complexes of the present invention is one comprising a $C_4$–$C_{20}$, preferably a $C_4$–$C_{12}$, saturated cyclic ether such as tetrahydrofuran, tetrahydropyran and the lower alkyl or lower alkoxy derivatives thereof, e.g., methyl tetrahydrofuran, ethyl tetrahydropyran, ethoxy tetrahydrofuran, methoxytetrahydropyran and the like. Tetrahydrofuran is particularly preferred. Inert liquids such as the above-described hydrocarbons and alkyl ethers can be used in conjunction with these preferred cyclic ethers and, of course, will form a part of the reaction medium when dispersions of magnesium hydrocarbons and/or alkyl ethers are employed. When the cyclic ethers are used in conjunction with another solvent, it is preferred to have the cyclic ether present in an amount of from 0.25 to 2 or more moles per gram atom of magnesium. More than two moles of diolefin, however, can combine with the magnesium. Thus, for example, when two moles of isoprene are reacted with magnesium, the compound $(C_5H_8)_2Mg$ will normally form. However, if the reaction is continued in the presence of isoprene, it is possible to incorporate anywhere from 1 to 6 more moles of isoprene to the compound and form such compounds as $(C_5H_8)_3Mg$, $(C_5H_8)_4Mg$; and, in general, compounds of the formula $(R')_nMg$, wherein $R'$ is one or more $C_4$–$C_{40}$ conjugated diolefins and $n$ is an integer from 2 to about 8.

A $C_4$–$C_{10}$ conjugated diolefin such as butadiene, isoprene, piperylene, hexadiene, myrcene, 2-3-dimethylbutadiene, 2-phenylbutadiene, alpha-phellandrene; and mixtures of the above-mentioned group such as $(C_5H_8C_4H_6)$, $(C_5H_8$-myrcene), $(C_5H_8$–$C_{10}H_{16})$ where $C_{10}H_{16}$ is alpha-phellandrene or allocimene (butadiene-isoprene), (butadiene-allocimene), (butadiene-myrcene) and the like are preferred for reaction with magnesium to form the organomagnesium complex.

Generically, such conjugated diolefins may be represented by the formula

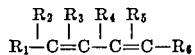

where $R_1$, $R_2$, $R_3$, $R_4$, $R_5$, and $R_6$ may be the same or different and selected from the group consisting of hydrogen, alkyl $(C_1$–$C_6)$, alkenyl $(C_1$–$C_6)$, cycloalkyl $(C_3$–$C_6)$, cyclo alkylenyl $(C_4$–$C_6)$, aryl $(C_6$–$C_{20})$, aralkyl $(C_7$–$C_{20})$, alkadienyl $(C_3$–$C_{10})$. additionally, $R_1$ may be joined by $R_6$ to form a cyclic such as in alpha-phellandrene.

It is preferred, however, that $R_1$ or $R_2$ be hydrogen and that $R_5$ or $R_6$ be hydrogen so that the carbon atom attached to a double bond in the molecule is not completely substituted. When substitution is complete, the conjugated diolein is somewhat unreactive as regards formation of a magnesium complex unless it is in a mole to mole mixture with isoprene, butadiene, myrcene or one of the other more reactive incompletely substituted types of conjugated diolefins. Alpha-phellandrene, however, wherein $R_1$ is joined to $R_6$ is quite reactive by itself.

In general, for magnesium complex formation to proceed according to the first stage, i.e. reactions (a) to (c), it is necessary that there be present either a conjugated diolefin or an activated olefin such as styrene; $C_1$–$C_7$ alkyl, alkoxyl or aryloxyl substituted styrene; or a $C_{12}$–$C_{40}$ condensed ring aromatic hydrocarbon, preferably containing at least three condensed rings. Such conjugated diolefins and activated olefins will combine with compounds containing olefinic linkages to produce the desired organomagnesium complex. Table I is exemplary of organomagnesium complexes which can be formed. A fuller discussion of the preparation of these magnesium complexes can be found in the following patents: U.S. 3,351,646, U.S. 3,354,190 and U.S. 3,388,179.

TABLE I

| Conjugated diolefin or activated olefin | Co-reactants | Magnesium complex product |
|---|---|---|
| Isoprene | Isoprene | Diisoprene Mg. |
| Do | 2 (isoprene) | Triisoprene Mg. |
| Do | 7 (isoprene) | Octaisoprene Mg. |
| Butadiene | 5 (butadiene) | Hexabutadiene Mg. |
| Anthracene | 2 (isoprene) | (Diisoprene-anthracene) Mg. |
| Styrene | Isoprene | (Isoprene-styrene) Mg. |
| Isoprene | Styrene and anthracene | (Isoprene-styrene-anthracene) Mg. |
| Myrcene | Isoprene | (Myrcene-isoprene) Mg. |
| Do | Myrcene | Dimyrcene Mg. |
| Isoprene | α-Phellandrene | (α-Phellandrene-Isoprene) Mg. |
| Do | Alloocimene | (Isoprene-alloocimene) Mg. |
| Do | Furan | (Isoprene-furan) Mg. |
| Do | α-Methylfuran | (Isoprene-α-methylfuran) Mg. |
| Do | Thiophene | (Isoprene-thiophene) Mg. |

The second stage of the present process, resulting in the formation of compounds of formula $(R)_3SnR'Sn(R)_3$, is accomplished by reacting on organomagnesium complex of the above-mentioned group, either in situ, or after removal from its reaction medium, with a trialkyltin halide wherein the alkyl groups can be methyl or ethyl or combinations thereof. The solvents which can be utilized in this second stage are the same as utilized in the organomagnesium complex formation; however, tetrahydrofuran is preferred. Reaction can be effected at temperatures ranging from about −15° to about 160° C. Pressure considerations are not critical, and atmospheric operation is preferred. The alkyltin compound is added to the organomagnesium complex in a 2:1 molar ratio. Reaction time can vary from almost instantaneous up to about 4 hours. It is preferred that the reaction mixture be agitated. Since both stages of the process are sensitive to moisture and oxidation, it is essential to carry out the process under anhydrous conditions and to blanket the reaction mixture with an inert gas such as nitrogen, helium, argon and the like.

As noted, the preferred new and useful compositions of this invention are characterized by the formula $$R_3SnR'SnR_3$$

where R and R' are as previously mentioned.

Exemplary of such compounds are the following: Bis-trimethyltindiisoprene, bis-triethyltintriisoprene, bis - trimethyltinoctaisoprene, bis-trimethyltinhexabutadiene, bis-trimethyltindiisopreneanthracene, bis-(p-dimethylaminophenyldimethyltin)-diisoprene, bis-(p-anisyldimethyltin) isoprenestyrene, bis-(p-trimethyltinphenyldimethyltin) isoprene-styrene-anthracene, bis-triethyltin-myrcene-isoprene, bis-trimethyltin-dimyrcene, bis-trimethyltin - α - phellandrene isoprene-alloocimene, bis - trimethylisoprene-furan, bis-trimethyltin-isoprene - α - methylfuran, bis-trimethyltin-isoprene-thiophene, bis-(p-trimethyl-chloro-ammoniophenyldimethyltin)diisoprene, bis-(p-trimethylsilylphenyldimethyltin)-2,3-dimethylbutadiene, bis - trimethyltin, bis-1,4-diphenylbutadiene, etc.

As previously noted, the bis-trialkyltin compounds of this invention are useful as systemic pesticides, particularly against lepidopterus insect larvae, such as, e.g., Southern army worm, cotton boll worm, salt marsh caterpillar, etc.

When contemplated for use as a systemic pesticide, the compounds of this invention may be brought into intimate admixture with a suitable carrier and may be used in any suitable form such as: a solution, dust, emulsion, suspension, aerosol, fog or the like, or as a pure compound. Solvents or carriers suitable in this regard include: kerosene, naphtha, and other liquid hydrocarbons boiling preferably above room temperature. Since the pure compounds of the present invention are very inert except as to acids, almost any organic solvent excluding acids, such as ketones, esters, alcohols, phenols, aldehydes, etc. can be used. Solid inert carrier materials are also contempleted and utilized such as, for example, talc, kieselguhr, etc.

The active insecticidal ingredient of this invention may be applied in the form of an aqueous emulsion or dispersion preferably employing a wetting or dispersing agent, as for example, Triton X–100 (an alkylated aryl polyether alcohol), Tween 20 a sorbitan monolaurate polyoxyethylene derivative, etc. In some instances, the active ingredient can be advantageously applied as the pure compound without a carrier of any kind.

The present invention is further illustrated in greater detail by the following examples, but it is to be understood that the present invention in its broadest aspects is not necessarily limited in terms of the specific temperatures, residence times, separation techniques, and other process conditions by which the compounds and/or compositions described and claimed are prepared and used.

EXAMPLE 1

Preparation of diisoprene magnesium

One gram atom of magnesium (24.3 g.) was charged to a flask equipped with a magnetic stirrer. The flask was swept with dry nitrogen and 2 ml. ethylene bromide and 6 ml. tetrahydrofuran were added whereupon the temperature in the flask rose to 49° C. Two moles of isoprene in 600 ml. tetrahydrofuran were added slowly to the flask over a period of about 3¼ hours. The temperature dropped to 43° C. a few minutes after addition was started and heating was started and after about 15 minutes the temperature was 51° C. and a green color began to appear. Upon completion of the addition of the isoprene and the solvent, temperature at reflux was 57° C. and the reaction mixture was a deep yellow-amber color. Heating at reflux was continued, the temperature gradually climbing to 69° C., at which temperature nearly all of the magnesium was observed to have dissolved and the color was a very dark black-green.

EXAMPLE 2

Preparation of triisoprene magnesium

Magnesium (1.0 gram atom, 24.3 g.), activated by ethylbromide and tetrahydrofuran was reacted with one mole of isoprene in 200 ml. of tetrahydrofuran by the process of Example 1 until the temperature of reflux reached 68–69° C. where it was held for 40 hours. Only about half of the magnesium was consumed (from visual inspection). A second mole of isoprene in 200 ml. tetrahydrofuran was added gradually and reaction continued until reflux was at 68–69° C. for about 12 hours. Most of the magnesium had been consumed. A third mole of isoprene was added—the reflux temperature fell to 54° C.—it required 17 hours at reflux before the temperature finally reached 61–62° C.

EXAMPLE 3

Preparation of octaisoprene magnesium

To one gram atom (24.3 grams) of magnesium turnings, initiated with 2 ml. of ethylene dibromide and 3 ml. of tetrahydrofuran was slowly added over a period of 13½ hours, 8 moles of isoprene in 800 ml. of tetrahydrofuran with anchor stirring and heating at reflux. At the finish of the addition, the temperature of reflux was 49° C. Heating at reflux was continued for 80 hours to a final temperature of 56° C.

EXAMPLE 4

Preparation of mixed isoprene-anthracene Grignard

To one gram atom (24.3 g.) of magnesium turnings initiated by 2 ml. of ethylene bromide and 3 ml. tetrahydrofuran (THF) was added a slurry of one mole of anthracene and two moles of isoprene in 500 ml. of THF. This was heated at reflux for 5⅓ hours where (the temperature rose 61–67° C.) the solution became very viscous. Then 200 ml. of the THF was added. Nearly all of

EXAMPLE 5

Preparation of styrenemagnesium

To one gram atom (24.3 g.) of magnesium turnings were added 3 ml. of tetrahydrofuran (THF) and 2 ml. of ethyl bromide as initiator. As soon as initiation began (as evidenced by boiling and evolution of heat) a mix of 2 moles (208 g.) of styrene in 400 ml. of THF was added very slowly with stirring. The temperature rose rapidly to 55° C. over a period of two minutes and then started to drop. Heat was applied and the addition continued. After 6 hrs. 17 mins. addition and heating were interrupted (T=77° C.—250 ml. in.) overnight. After 3 hrs. 30 min. of heating in the morning (at 78° C.) a Gilman test was made—it was negative— i.e. no Grignard present. Two ml. of butyl bromide were added—a vigorous reaction then ensued and addition was continued. All being added over a period of 2 hrs. 22 min. Temperature fell to 55° C. Heating was continued as was stirring for 32 hours—with a stopping of heating overnight. (heated 8:15–8:30 a.m. to 4:30 p.m.); stirring was continued overnight. The solution went to light yellow, then amber and finally very deep brown-black.

EXAMPLE 6

Preparation of isoprenestyrenemagnesium

By the process of Example 5 a mixture of one mole of isoprene and one mole of styrene in 400 ml. of tetrahydrofuran was added to magnesium turnings (one g. at 24.3 g.) activated by one ml. of ethylene dibromide in 3 ml. of THF. Within 8 minutes the solution became bright yellow in color and then over a period of 10 minutes it became deep green black. It was heated for a further 32 hours after addition, the temperature rising from 63° C. to 69.5° C. as the isoprene reacted. Very little magnesium was left unreacted.

EXAMPLE 7

Preparation of isoprene-styrene-anthracene magnesium

By the process of Example 6 using ethyl bromide to initiate the reaction 0.25 mole of styrene, 0.25 mole of isoprene plus 0.5 mole of anthracene in 400 cc. of THF were reacted for eight hours. The solution on washing became a hard glassy black, extremely viscous semi-solid material which was slowly broken up by adding additional THF.

EXAMPLE 8

Preparation of isoprene myrcene-magnesium 24.3 grams magnesium flakes and 1 cc. ethylene bromide in 3 cc. tetrahydrofuran were added to a flask. One mole of myrcene and one mole of isoprene in 400 cc. tetrahydrofuran were added dropwise to the flask. The mixture was heated at reflux for about 7½ hours. Analysis of the product by titration showed an 85.9% yield of the isoprene myrcene-magnesium Grignard reagent.

EXAMPLE 9

Preparation of dimyrcenemagnesium

To one gram atom (24.3 g.) of magnesium turnings activated by 2 ml. of ethyl bromide and 3 ml. of tetrahydrofuran was slowly added a solution of one mole (136 g.) of myrcene in 300 ml. of tetrahydrofuran with magnetic stirring and heating to reflux. After three hours of addition (all but about 100 ml. in) the temperature was 68° C. and color was developing. A further eight hours heating (T=70° C.) yielded a dark green-black solution. After eight hours' further heating a second mole of myrcene in 100 ml. of tetrahydrofuran was added and a further 24 hours heating led to complete consumption of the magnesium.

EXAMPLE 10

Preparation of isoprene allo-ocimenemagnesium

Magnesium (24.3 g.) activated, was refluxed with 1.0 mole (136 g.) alloocimene in 250 ml. tetrahydrofuran for 24 hours with intermittent reinitiation of the magnesium, including addition of a vigorously reacting 1.0 g. of Mg with 1 ml. ethyl bromide and 2 ml. THF with no reaction ensuing. Then 1.0 mole of isoprene in 100 ml. of tetrahydrofuran was added and the magnesium activated by 1 ml. ethyl bromide. Heating for 37 hours resulted in complete solution of the magnesium.

EXAMPLE 11

Preparation of bis-trimethyltin triisoprene

To a 1-liter, 4-necked flask equipped with a nitrogen inlet, thermometer, magnetic stirrer and dropping funnel were added 0.5 mole (99.6 g.) of trimethyltinchloride, 200 ml. of benzene, and 100 ml. of tetrahydrofuran. To the reaction flask was then added 0.25 mole of triisoprene-magnesium Grignard prepared according to Example 2, with stirring, over a 3-hour period. After addition of the Grignard, the mixture was refluxed for two hours. The mixture was then cooled to room temperature whereupon 100 ml. of water were added. The organic layer was separated and dried; and the solvent evaporated to yield 120.6 g. of a clear yellow liquid which analyzed 44.70% Sn (theory 44.5%). The structure of the product was confirmed by NMR which showed vinylic hydrogen to be present.

EXAMPLE 12

Preparation of bis-trimethyltin tetraisoprene

To a 1-liter, 4-necked flask equipped with a nitrogen inlet, thermometer, magnetic stirrer and dropping funnel were added 0.5 mole (99.6 g.) of trimethyltinchloride, 200 ml. of benzene, and 100 ml. of tetrahydrofuran. To the reaction flask was then added 0.25 mole of tetraisoprenemagnesium Grignard, with stirring, over a 3-hour period. After addition of the Grignard, the mixture was refluxed for two hours. The mixture was then cooled to room temperature whereupon 100 ml. of water were added. The organic layer was separated and dried; and the solvent evaporated to yield 130.6 g. of a cloudy yellow liquid which analyzed 40.46% Sn (theory 37.9). The structure of the product was confirmed by NMR which showed vinylic hydrogen to be present.

It is to be noted that for ease, and avoidance of confusion in naming the products of the present invention, the hydrocarbon portion of the magnesium complex, i.e., R', and the corresponding portion in the bis-trialkyltin products have been named, not on the basis of the actual structure of the product, but rather on the basis of the olefinic unit or units used as the reactant or reactants. Thus, for example, Table I lists the product of the reaction of two moles of isoprene with magnesium as diisoprene Mg; not by the name of the actual structure of the magnesium complex resulting, but rather on the olefinic unit utilized as the reactant, i.e., isoprene.

In order to determine and compare the systemic insecticidal activity of the compounds of the present invention, the experiments listed as Examples 13 to 18, were performed on lima bean plants. The host plant soil was first brought to a semi-dry condition (approximately 50% moisture capacity). The test compound (contained in a water carrier) was then added to the soil surface. No water was added during the following 48 hours, whereupon the plant was then provided subterranean water. The Southern army worms were then caged on the test plants for 48 hrs. and then observed for percentage mortality, feeding and plant injury. The data and results from these experiments are included in Table II.

EXAMPLE 19

In the following example, bis-trimethyltin tetraisoprene was applied in increasing exposure periods to determine the effect on time and the ability of the compound to control Southern army worm. The compound was applied in water to the soil surface; no water was added during the next 48 hours. Insects were then caged on a first set of plants for 48 hours, on a second set of plants 48 hours later, for 48 hours. The data and results are included in Table III, along with a similar experiment performed using Di-Syston and an untreated control experiment.

In order to determine effectiveness of the compounds of the present invention as systemic poisons against the Southern army worm and the Salt marsh caterpillar, the following experiments were performed. The test compound in water carrier was added to the soil surface, no water was added during the following 48 hours whereupon the plants were then provided subterranean water. The insects were then introduced onto one set of plants and then observed after 48 hours for percentage mortality, feeding and plant injury. Insects were introduced onto another set of plants 30 days after application of the compound to the soil whereupon after a 48 hour period, the plants were observed for percentage mortality, feeding and plant injury. The data and results for these examples are included in Table IV and are in terms of residual systemic activity 48 hours and 30 days after application to the soil of the host plant.

TABLE II

| Example No. | Compound | Conc., p.p.m. soil wt. | Percent mortality: plant injury |
|---|---|---|---|
| 12 | Me$_3$Sn—(CH$_2$—C(CH$_3$)=CHCH$_2$)$_4$—SnMe$_3$ | 10<br>2 | 100:0<br>100:0 |
| 13 | Me$_3$Sn—(CH$_2$—C(CH$_3$)=CHCH$_2$)$_3$—SnMe$_3$ | 0.4<br>10<br>2<br>0.4 | 100:0<br>100:0<br>100:0<br>20:0 |
| 14 | 9,10-bis(CH$_2$—C(CH$_3$)=CHCH$_2$SnMe$_3$)anthracene | 10<br>2<br>0.4 | 80:0<br>100:0<br>13:0 |
| 15 | (MeO)$_2$P(=O)—S—CH$_2$CH$_2$SOEt<br>(Meta-Systox-R) | 10<br>2<br>0.4 | 0:0<br>0:0<br>0:0 |
| 16 | (EtO)$_2$P(=S)—SCH$_2$CH$_2$SEt<br>(Di-Syston) | 10<br>2<br>0.4 | 0:0<br>0:0<br>0:0 |
| 17 | Untreated | | 0:0 |

TABLE III

| Sample | Conc., p.p.m. soil wt. | Percent mortality: plant injury after treatment— | | |
|---|---|---|---|---|
| | | 48 hrs. | 96 hrs. | 144 hrs. |
| Me$_3$Sn—(CH$_2$C(CH$_3$)=CHCH$_2$)$_4$—SnMe$_3$ | 25<br>10<br>5<br>2.5<br>1.0 | 100:0<br>100:0<br>100:0<br>87:0<br>87:0 | 100:M<br>100:Sl–M<br>93:Sl<br>93:T<br>93:0 | 100:M-Sv<br>93:M-Sv<br>13:M<br>13:0<br>0:0 |
| DiSyston | 100 | 20:Sl | 13:Sl | 13:Sl |
| Untreated | | 0:0 | 0:0 | 0:0 |

TABLE IV

| | | 48 hour residual | | | |
|---|---|---|---|---|---|
| | | Southern armyworm | | Salt marsh caterpillar | |
| Compound | Conc., p.p.m. | Percent dead | Percent leaf eaten | Percent dead | Percent leaf eaten |
| Bis-trimethyl tin myrcene | 100<br>20<br>5 | 57<br>20<br>7 | 8<br>18<br>48 | 35<br>40<br>0 | 7<br>13<br>37 |
| Bis-trimethyl tin tetraisoprene | 100<br>20<br>5 | 93<br>50<br>0 | 4<br>12<br>55 | 75<br>13<br>7 | 12<br>26<br>75 |
| Untreated | | 0 | 70 | 7 | 75 |
| | | 30 day residual | | | |
| Bis-trimethyl tin myrcene | 100<br>20<br>5 | 100<br>100<br>100 | 5<br>13<br>17 | (¹)<br>100<br>83 | (¹)<br>12<br>25 |
| Bis-trimethyl tin tetraisoprene | 100<br>20<br>5 | (¹)<br>100<br>100 | (¹)<br>5<br>13 | (¹)<br>100<br>100 | (¹)<br>12<br>22 |
| Untreated | | 0 | 92 | 0 | 95 |

¹ Plant killed.

What is claimed is:

1. Organotin compounds of the formula

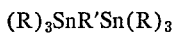

where R is an alkyl group selected from the group consisting of $CH_3$ and $C_2H_5$, and R' is a diradical of the formula

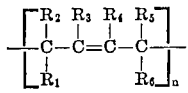

where $R_1$ to $R_6$ can be the same or different and each is radical selected from the group consisting of hydrogen, lower aliphatic, aryl, aralkyl, and alkadienyl; and $n$ is a positive integer of from 2 to 8.

2. Organotin compounds according to claim 1 wherein $R_3$ is a methyl group.

3. Bis-trimethyltin triisoprene.

4. Bis-trimethyltin tetraisoprene.

5. Organotin compounds according to claim 1 wherein said diradical is one selected from the group consisting of:

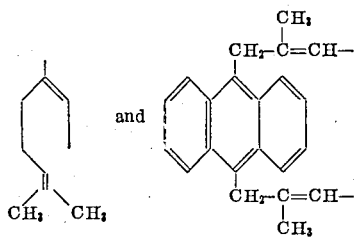

References Cited

UNITED STATES PATENTS 3,149,101  9/1964  Hubel et al. _____ 260—429.7 X

TOBIAS E. LEVOW, Primary Examiner

W. F. W. BELLAMY, Assistant Examiner

U.S. Cl. X.R.

424—288